UNITED STATES PATENT OFFICE.

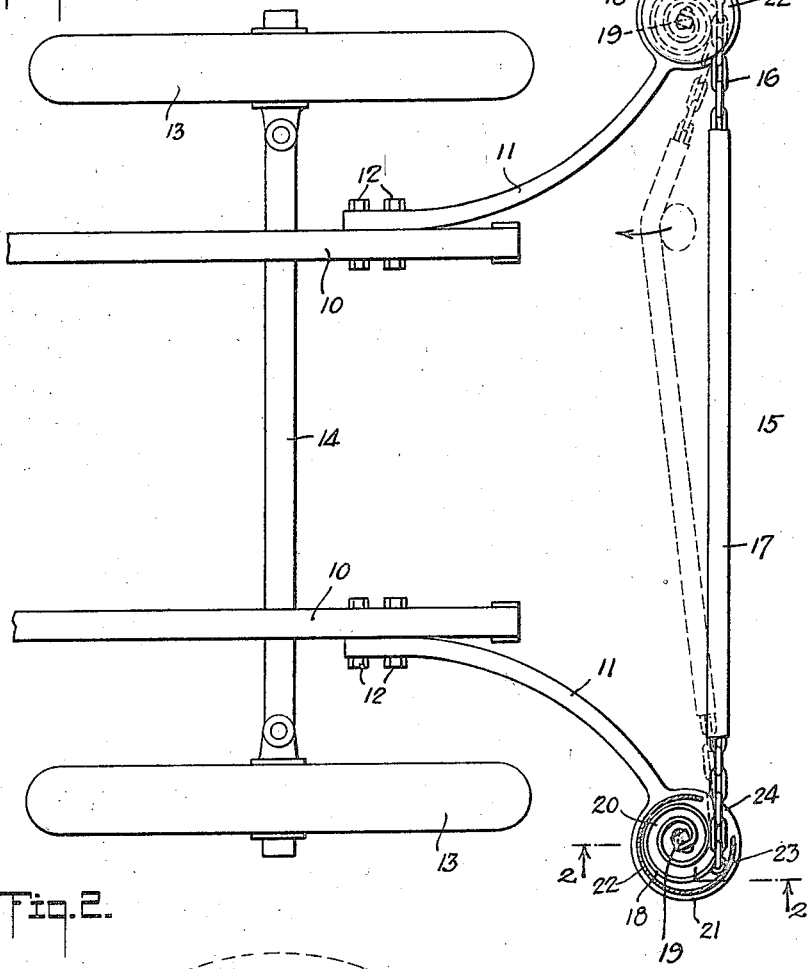
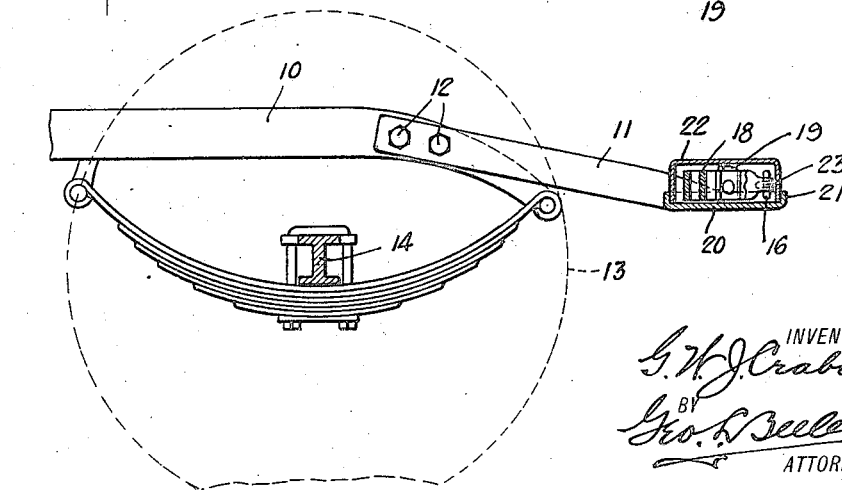

GEORGE W. J. CRABB, OF EAST ORANGE, NEW JERSEY.

RESILIENT BUMPER.

1,426,964.                     Specification of Letters Patent.      Patented Aug. 22, 1922.

Application filed April 17, 1922. Serial No. 553,736.

*To all whom it may concern:*

Be it known that I, GEORGE W. J. CRABB, a citizen of the United States, residing at East Orange, in the county of Essex and State of New Jersey, have invented certain new and useful Improvements in Resilient Bumpers, of which the following is a specification.

This invention relates to safety appliances for road vehicles and has particular reference to automobile accessories, but it is to be distinctly understood that in some of its phases the appliance may be utilized in other types of vehicles, especially those that are self-propelled or power operated.

Among the objects of the invention is to provide a bumper, the principal part or active portion of which is flexible and resiliently supported so as to not only cushion the blow of the object or person struck by the bumper but also to reduce the impact of the vehicle itself, whereby the damage to the vehicle will be proportionately reduced over the effect commonly experienced by the use of heavy rigid bumpers.

Another object of the invention is to produce a bumper possessing unusually neat appearance and one which may be attached to the vehicle frame or the like with the greatest facility.

With the foregoing and other objects in view, but without restricting the scope of the invention unnecessarily to the specific formation of devices illustrated and described herein, except as may be required by the scope of the claims, the invention will be noted more in detail from the following specific description in connection with the accompanying drawings, in which—

Figure 1 is a plan view of my improvement, full lines showing the normal position of the flexible member, and dotted lines indicating a deflected position thereof.

Fig. 2 is a side elevation of the same, parts being in section of the broken line 2—2 of Fig. 1, and the position of the wheels being indicated by a dotted circle.

Referring now more specifically to the drawings, 10 indicates any suitable rigid bars or members of the frame or chassis at either end of the vehicle, as for example the front end as illustrated, and extending forward and laterally therefrom are a pair of rigid horns or arms 11, each being shown as connected rigidly to a bar 10 by any suitable strong separable fasteners, such as bolts 12 extending horizontally through these parts. The forward end of each arm 11 is extended laterally from the frame so that its free end rolls outward beyond the vertical plane of the adjacent wheel 13, and the free end of the arm may be bent or otherwise deflected downward somewhat with respect to the level of the frame 10 so as to bring the front or free end of the arm to or nearly to the level of the axle 14 of the vehicle, so as to to best protect the wheels.

The active element or impact member of the bumper is shown as a whole at 15 and comprises a strong chain 16 typifying any suitable flexible element, it being understood that a cable, rope or the like may be used for this purpose. 17 indicates a sheath or cover of fabric, leather or other finishing facing material which is preferably used to cover the main or exposed portion of the impact receiving and resisting member 16.

As a suitable means for securing the flexible member 15 resiliently upon the front ends of the arms 11, I provide for each arm a spring 18, shown as of spiral form, one end of each spring being anchored rigidly to a lug 19 extending upward from about the center of the plate or base 20 which may be integral with or otherwise secured to the front end of the adjacent arm and constituting the lower portion of a housing or casing. This casing as shown best in Fig. 2 comprises a flange 21 to or within which is secured in any suitable manner the upper or cover portion 22 of the casing. Each spiral spring 18 is coiled loosely around the lug 19 and has its free end located normally in front of and slightly outward laterally from the lug but directed toward the opposite side of the machine, the end of the spring being formed preferably into a hook 23, the point of which is directed away from the opposite side and upon which any selected link of the chain 16 may be engaged. Thus it will appear that the flexible impact member is effectively adjusted according either to the space between the two springs or according to the force desired to be exerted by the springs in practice. For example, by hooking up the chain one or more links the springs will accordingly be put under greater tension, so that added power will be stored therein; and so the flexible impact member will accordingly be the stiffer and will be deflected to a proportionally less extent when the impact takes place. The ends of the chain extend into the casings through openings 24 along their inner sides. Otherwise the casings are closed and completely house the springs. In operation if a person or obstacle be struck by the bumper the force of the impact will be received flexibly and the impact member 15 will be deflected into the obtuse angular form according to the point thereof that receives the impact, as suggested by the dotted line of Fig. 1, and the resilient connectors 18 will cushion the force of such impact. Moreover the resiliency of the springs acting through the flexible impact member will tend to cast the obstacle forward or away from the machine.

This improved type of bumper may obviously be employed in lieu of the usual rigid bumper, and the stiff parts are calculated to be sufficiently strong to take care of any ordinary or expected circumstances to be encountered by such machine without being displaced or damaged.

I claim:

1. A bumper for a vehicle comprising a pair of rigid arms having their free ends so spaced as to cover the adjacent wheels of the vehicle, and an impact member resiliently connected at its ends upon said arms, said impact member being flexible and the means for attaching it to the arms comprising a pair of springs attached to the respective arms.

2. In an automobile bumper, the combination of a spring, an impact member of flexible construction and adjustable as to effective length, means to attach one end of the impact member to said spring, and means to anchor the other end of the impact member.

3. A device as set forth in claim 2 in which the impact member is provided at its ends with attachment links and the means for attaching the said end to the spring includes a hook co-operating with the adjacent end link.

4. A device as set forth in claim 2 in which the means for attaching the impact member in place is a pair of spiral springs each having one end rigidly anchored on its support while its opposite end is directly engaged by the impact member.

In testimony whereof I affix my signature.

GEORGE W. J. CRABB.